United States Patent Office 3,376,744
Patented Apr. 9, 1968

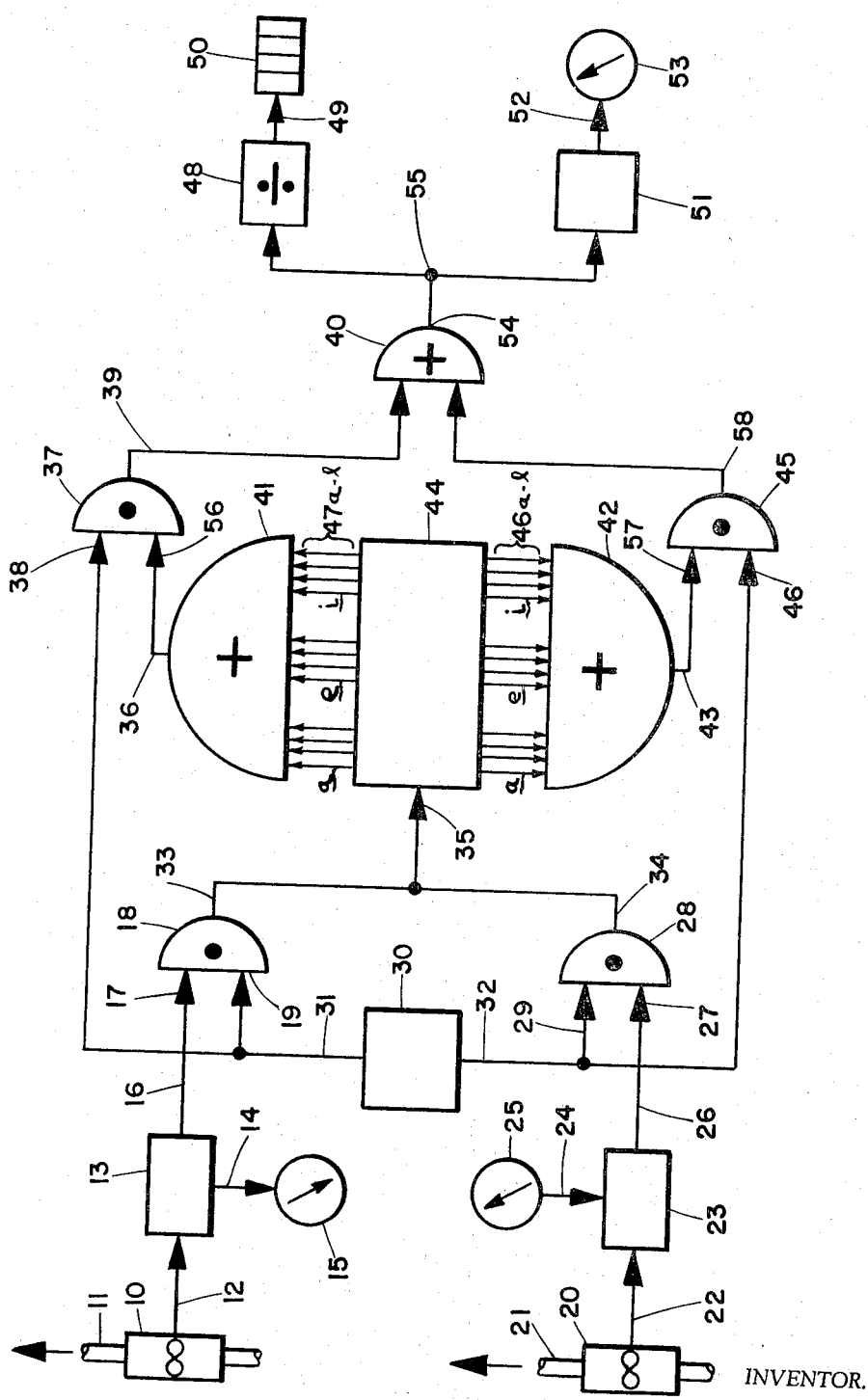

3,376,744
FLOW MEASUREMENT SYSTEM
Dale F. Kister, Thousand Oaks, and James E. Moore, Reseda, Calif., assignors to The Foxboro Company, Foxboro, Mass., a corporation of Massachusetts
Filed July 7, 1966, Ser. No. 563,546
9 Claims. (Cl. 73—195)

This invention relates to flow measurement and, more particularly, to flow measurement systems for totalizing flow data from a plurality of measured flows.

In a variety of applications, such as in aircraft fuel supply systems, it is desirable to have a master fuel consumed indication which is a totalization of all fuel consumed from a plurality of sources by a number of engines. The provision of means to combine flow readings from a number of fuel flow lines on the basis of a common conversion factor is necessary for this result.

Accordingly, it is an object of this invention to provide a flow measurement system having the capacity to monitor the flows of each of a plurality of flow lines and sum the data obtained therefrom.

It is another object of this invention to provide a flow measurement system designed to scale the data from a plurality of flowmeters so that the scaled data may be algebraically summed for totalizing the result.

Another object of this invention is to provide a flow measurement system incorporating a plurality of flowmeters, each having a differing pulse per gallon output, including means for weighing these outputs to obtain equal relative measurement significance among these outputs and also including means to sum these weighted outputs to yield total flow indication for the system.

Another object of this invention is to provide scaling for a plurality of channels each receiving input measurement data of varying significance so that the differing channel outputs may be totalized to yield a single indication representing a summation of all the measurement data from the system.

Another object of this invention is to provide a means of summing pulse trains from a plurality of channels having unpredictable phase relationship therebetween, to provide a summed pulse train having a frequency proportional to the sum of data in all the channels.

Another object of this invention is to permit the use of a plurality of turbine meters having differing ranges and calibration factors with a single total flow indicator.

These and other objects of this invention will be apparent from the following description thereof, taken in conjunction with the single figure therewith, which is:

A block diagram of the flow measurement system of the invention.

Referring now to this figure, turbine flowmeter 10 is inserted in fuel line 11 thereby monitoring fuel flow therethrough. Turbine flowmeter 10 produces an electrical pulse train output 12 which is proportional in frequency to the flow rate of the fuel through line 11. Turbine flowmeter 10 illustratively has a measurement range of from 0.2 to 2 gallons per minute, over which turbine flowmeter 10 is accurate within required tolerances, illustratively ±0.5%. In addition, turbine flowmeter 10 illustratively has a calibration factor of 24,180 pulses per gallon; that is to say, 24,180 pulses are produced at output 12 of turbine flowmeter 10 for each gallon of fuel flowing through flowmeter 10.

Pulse train output 12 is supplied to the input of pulse amplifier and converter 13. One function of pulse amplifier and converter 13 is to convert pulse train 12 to a D.C. level proportional to the pulse frequency of pulse output 12. This D.C. level is supplied from output 14 of pulse amplifier and converter 13 to meter 15, which thereby provides an indication related to the flow rate through turbine flowmeter 10. The scale of D.C. conversion in pulse amplifier and converter 13 may be adjusted to bring meter 15 to full scale at the corresponding maximum flow rate through turbine meter 10.

The second function of pulse amplifier and converter 13 is to amplify the pulses of output 12 to a pulse amplitude suitable for processing by the system gates and function devices.

Output 16 of pulse amplifier and converter 13 consists of a pulse train having the same frequency as the pulse train from output 12 of turbine meter 10 and having an amplitude suitable for application to signal input 17 of "and" gate 18. The second input of "and" gate 18 is its enabling input 19. When an enabling signal is present at enabling input 19, "and" gate 18 passes the pulse train applied to its input 19 to its output 33.

Turbine flowmeter 20 is inserted in second fuel line 21, thereby monitoring fuel flow therethrough. Turbine flowmeter 20 produces an electrical pulse train output 22, in this case illustratively having a frequency of 13,215 pulses per gallon passing through. This figure is termed the calibration factor of turbine flowmeter 20. Turbine flowmeter 20 illustratively has a measurement range of 0.6–6 gallons per minute, over which range turbine flowmeter 20 is accurate within required tolerances, illustratively ±0.5%.

Pulse train output 22 of turbine flowmeter 20 is coupled to the input of pulse amplifier and converter 23. This unit functions in a similar manner to pulse amplifier and converter 13 having a D.C. output 24 supplied to meter 25, thereby indicating the flow rate through turbine flowmeter 20. Pulse amplifier and converter 23 has an amplified pulse train output 26 having the same frequency as pulse train 22 from turbine flowmeter 20 with a sufficient amplitude to be applied to following circuitry.

Pulse train output 26 is applied to signal input 27 of "and" gate 28. The second input of "and" gate 28 is its enabling input 29. "And" gate 28 functions similarly to "and" gate 18, passing the pulse train signal at its input 27 onto its output 34 when an enabling signal is present at its enabling input 29.

The enabling function for these "and" gates is performed by clock 30, which produces two clock outputs, 31 and 32, illustratively operating on a 50%–50% duty cycle basis although other duty cycles may be employed. A 50%–50% duty cycle clock having extreme accuracy may be simply made. While one clock output has an enabling signal thereon the alternate clock output does not. Clock output 31, is supplied to enabling input 19; clock output 32 is supplied to enabling input 29. The frequency of the clock output duty cycle may be of convenient switching frequency, illustratively 60 cycles per second.

In the illustrative example, "and" gate 18 passes pulses to its output 33 during 50% of the time; "and" gate 28 passes pulses to its output 34 the remaining 50% of the time. Thus, a pulse train appears only at either "and" gate output 33 or "and" gate output 34 at any one time. Each "and" gate output, 33 and 34 carries a pulse train having a flow significance twice that of its respective pulse train input, inasmuch as one-half the pulses in each pulse train input is eliminated by the 50% duty cycle enabling function.

Output 33 of "and" gate 18 and output 34 of "and" gate 28 are connected together and both applied to input 35 of multiplier 44. The function of multiplier 44 is to scale the pulse trains from outputs 33 and 34 to pulse trains each having a uniform flow significance in the system.

Multiplier 44 has a single input 35, which carries pulse train output 33 derived from flowmeter 10 during 50% of the time and carries pulse train output 34 derived from flowmeter 20 the remaining 50% of the time. Multiplier 44 is a digital counter illustratively having two sets of output lines 46a–l and 47a–l.

A set of output lines a–l is divided into three decade counters having four output lines each. Each decade carries binary pulses on its four output lines in a coding of 4–2–2–1 respectively for each ten pulses into the decade counter. A decade counter sends one pulse to a successive decade for each nine pulses in. With this arrangement, a three digit decimal multiplicative factor may be easily selected, each decade representing one decimal digit. The output line from a particular decade are selected that sum to the decimal digit desired. Multiplier 44 can multiply the pulse train at its input 35 by a factor of zero to .999, depending upon the particular selection of output lines a through l chosen for summing. For lines 47a–l, a factor of 0.414 is illustratively chosen.

The decade having output lines a, b, c, d provides the most significant digit, the decade e, f, g, h the next most significant digit, and decade i, j, k, l the least significant digit. Output line a is selected to provide the most significant decimal digit 4, output line h the decimal digit 1, and line i the least significant decimal digit 4. Thus lines a, h, and i are selected for pulse transfer to "or" gate 41. Since no pulses occur simultaneously on any two lines of a set a–l, "or" gate 41 acts to simply combine all received pulses from lines 47a, h, i into output 36 of "or" gate 41. Output 36 is thus the sum of the pulses received from multiplier 44 and carries 0.414 of the pulses at input 35.

Output 36 of "or" gate 41 may carry pulses 100% of the time, inasmuch as pulse train outputs 33 and 34 have been combined to input 35 of multiplier 44. It is desired to subtract from output 36 those pulses occurring at other times than the period during which "and" gate 18 is enabled, that is, to eliminate pulses other than the pulses from output 33 of "and" gate 18. To do this, output 36 is supplied to input 56 of "and" gate 37. Enabling input 38 of "and" gate 37 taken from output 31 of clock 30. Thus, "and" gate 37 is enabled simultaneously with "and" gate 18, and output 39 of "and" gate 37 carries a pulse train only during those times that a pulse train may appear at output 33 of "and" gate 18.

Output 39 carries a pulse train having a significance of 5,000 pulses per gallon. This obtains as the original flowmeter 10 calibration factor of 24,180 is divided by two by the action of "and" gate 18, thereby producing a pulse train having a significance of 12,090 pulses per gallon. Multiplication of 12,090 by the multiplier 44 factor of 0.414 yields 5,005 pulses per gallon, or approximately 5,000 pulses per gallon.

In a similar manner pulse train from output 34 of "and" gate 28 is passed through input 35 of multiplier 44 to output lines 46a–l thereof. A multiplication factor of 0.756 is desired in order to convert the flowmeter 20 calibration factor of 13,215 to approximately 5,000 pulses per gallon, considering the division by 2 effected by the 50% duty cycle. To obtain this multiplication factor of 0.756, output lines 46a, b, d are selected to provide decimal digit 7, lines 46e, h are selected to provide decimal digit 5, and lines i, j are selected to provide decimal digit 6. Thus lines 46a, b, d, e, h, i, j are selected to by summed by "or" gate 42.

Output 43 of "or" gate 42 is supplied to input 57 of "and" gate 45. The "and" gate 45 enabling input 46 is taken from output 32 of clock 30. Output 58 of "and" gate 45 is thus restricted to the same period of time that "and" gate 28 is enabled. Thereby, output 58 carries a pulse train only during that time output 34 of "and" gate 28 carries a pulse train.

In this manner, outputs 39 and 58, of the respective "and" gates 37 and 45, have pulse trains with the same pulse per gallon signifiance of approximately 5,000 pulses per gallon.

Since the pulses at output 39 of "and" gate 37 and the pulses at the output 58 of "and" gate 45 are not present simultaneously owing to the function of the duty cycle, outputs 39 and 58 may be summed by "or" gate 40. Output 54 of "or" gate 40 has a significance of 5,000 pulses per gallon.

Output 54 is applied to divider 48 which counts down by 5,000 to produce an output 49 of one pulse per gallon. Output 49 actuates digital counter 50 which thereby reads the total number of gallons monitored by the entire system. Output 54 of "or" gate 40 is also applied to the input of frequency to D.C. converter 51. Output 52 of converter 51 is a D.C. level proportional to the totalized pulse rate at its input. Output 52 is applied to meter 53 thereby providing a total rate indication of the flow rate in the combined flowmeters 10 and 20 of the system.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A flow measurement system for monitoring a plurality of flow lines each with a flowmeter having a particular calibration factor comprising:

a plurality of input gating means one for each said flowmeter and each one of said input gating means having an input responsive to a pulse train from its respective said flowmeter said pulse train having a frequency substantially proportional to flow rate through said respective flowmeter and each one of said input gating means having a gated flowmeter output and each one of said input gating means being periodically in turn gated open thereby passing said pulse train to its said gated flowmeter output, a multiplier having an input responsive to said gated flowmeter output from every one of said plurality of input gating means and said multiplier having a plurality of multiplier outputs, a plurality of multiplier gating means one for each said multiplier output and each one of said multiplier gating means being responsive to its respective said multiplier output and each multiplier gating means having a gated multiplier output and each one of said multiplier gating means being periodically in turn gated open in synchronism with one of said plurality of input gating means thereby passing its respective said multiplier output to its said gated multiplier output thereby restricting said gated multiplier output to a function of said gated flowmeter output, and means for summing each said gated multiplier output.

2. The flow measurement system of claim 1 wherein said function is a multiplicative function.

3. The flow measurement system of claim 1 wherein the term plurality is defined as two, so that there are two flowmeters, two input gating means, two gated flowmeter outputs, one multiplier, two multiplier outputs, two multiplier gating means, two gated multiplier outputs, and one means for summing.

4. The flow measurement system of clam 1 with timing means for synchronizing the gating open of an input gating means and a respective multiplier gating means.

5. The flow measurement system of claim 1 with processing means for each said flowmeter output for converting said flowmeter output to a pulse train suitable for application to said input gating means.

6. The flow measurement system of claim 1 with a flow totalizing indication.

7. The flow measurement system of claim 1 with individual flow rate indicators and a summed flow rate indicator.

8. The flow measurement system of claim 4 wherein each set of an input gating means and its respective multiplier gating means are gated open during a period successive to an alternate set gating period.

9. The flow measurement system of claim 3 wherein a 50% duty cycle is employed to alternately gate open each respective set of input gating means and respective multiplier gating means.

References Cited

UNITED STATES PATENTS

| | | | |
|---|---|---|---|
| 2,828,482 | 3/1958 | Schumann | 340—179 X |
| 2,851,882 | 9/1958 | Nottingham | 73—195 |
| 2,859,616 | 11/1958 | Fellows | 73—195 |
| 2,982,133 | 5/1961 | Haskell et al. | 73—195 |
| 3,229,077 | 1/1966 | Gross | 235—151.34 |

RICHARD C. QUEISSER, *Primary Examiner.*

EDWARD D. GILHOOLY, *Assistant Examiner.*